(12) United States Patent
Chen et al.

(10) Patent No.: US 11,767,029 B2
(45) Date of Patent: Sep. 26, 2023

(54) BEND DRIVING CONTROL METHOD FOR AUTONOMOUS VEHICLE, DEVICE, AND MEDIUM

(71) Applicant: BEIJING BAIDU NETCOM SCIENCE AND TECHNOLOGY CO., LTD., Beijing (CN)

(72) Inventors: Zhiyuan Chen, Beijing (CN); Xiaoxin Fu, Beijing (CN); Lin Ma, Beijing (CN); Xujian Li, Beijing (CN); Zhenguang Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 429 days.

(21) Appl. No.: 17/032,090

(22) Filed: Sep. 25, 2020

(65) Prior Publication Data
US 2021/0253127 A1    Aug. 19, 2021

(30) Foreign Application Priority Data
Feb. 19, 2020    (CN) .......................... 202010102674.8

(51) Int. Cl.
*B60W 30/095*    (2012.01)
*B60W 60/00*    (2020.01)
(Continued)

(52) U.S. Cl.
CPC ........ *B60W 60/0011* (2020.02); *B60W 30/09* (2013.01); *B60W 30/0953* (2013.01);
(Continued)

(58) Field of Classification Search
CPC ............. B60W 60/0011; B60W 30/09; B60W 30/0953; B60W 40/072; B60W 40/12;
(Continued)

(56) References Cited

U.S. PATENT DOCUMENTS

2013/0124041 A1    5/2013  Belser et al.
2019/0101925 A1*   4/2019  Simmons ............. G05D 1/0225
(Continued)

FOREIGN PATENT DOCUMENTS

CN    102275587 A    12/2011
CN    102576075 A     7/2012
(Continued)

OTHER PUBLICATIONS

Office Action for Japanese Application No. 2021-022636, dated Mar. 1, 2022, 5 pages.
(Continued)

*Primary Examiner* — Hunter B Lonsberry
*Assistant Examiner* — Daniel M. Robert
(74) *Attorney, Agent, or Firm* — Lippes Mathias LLP

(57) ABSTRACT

Embodiments of the present disclosure provide a bend driving control method for an autonomous vehicle, a device and a storage medium, and relate to a field of perception and autonomous driving technologies. The method includes: obtaining an occupancy width of an autonomous vehicle on a target bend when the autonomous vehicle drives on the target bend; detecting location information of an obstacle on the target bend; and controlling a driving route of the autonomous vehicle on the target bend based on the occupancy width and the location information of the obstacle.

16 Claims, 4 Drawing Sheets

(51) Int. Cl.
  *B60W 30/09*   (2012.01)
  *B60W 40/072*  (2012.01)
  *B60W 40/12*   (2012.01)
  *G06V 20/58*   (2022.01)

(52) U.S. Cl.
  CPC .......... *B60W 40/072* (2013.01); *B60W 40/12* (2013.01); *G06V 20/58* (2022.01); *B60W 2554/801* (2020.02)

(58) Field of Classification Search
  CPC ..... B60W 2554/801; B60W 2530/201; B60W 2552/30; B60W 2554/4041; B60W 60/0015; B60W 30/095; B60W 30/10; B60W 2050/0005; B60W 2552/50; G06V 20/58; G05D 1/0055; G05D 1/0088; G05D 1/0212; G05D 2201/0213; B60Y 2300/09; B60Y 2300/095; B60Y 2300/10
  See application file for complete search history.

(56) References Cited

U.S. PATENT DOCUMENTS

| | | | |
|---|---|---|---|
| 2020/0130696 A1* | 4/2020 | Xiao | G01C 21/20 |
| 2021/0245762 A1* | 8/2021 | Tsuru | G08G 1/16 |

FOREIGN PATENT DOCUMENTS

| | | | | |
|---|---|---|---|---|
| CN | 102822881 A | | 12/2012 | |
| CN | 104969275 A | | 10/2015 | |
| CN | 110667576 A | | 1/2020 | |
| DE | 102009045286 A1 | | 4/2011 | |
| DE | 102015121353 A1 | | 6/2017 | |
| FR | 3018488 A1 | * | 9/2015 | ......... B62D 15/0285 |
| GB | 2501167 A | * | 10/2013 | ......... B62D 15/0265 |
| GB | 2580400 A | * | 7/2020 | ............ B60W 30/10 |
| JP | H1138139 A | | 2/1992 | |
| JP | H06149374 A | | 5/1994 | |
| JP | H1138139 A | | 2/1999 | |
| WO | 2017014012 A1 | | 1/2017 | |
| WO | WO-2021109550 A1 | * | 6/2021 | ............ B60W 30/09 |

OTHER PUBLICATIONS

Extended European Search Report for Application No. 21157596.4, dated Jul. 15, 2021, 8 pages.

Office Action for Korean Application No. 10-2021-0021745, dated Feb. 18, 2021, 6 pages.

Office Action for Chinese Application No. 202010102674.8, dated Nov. 2, 2020, 14 pages.

* cited by examiner

BEND DRIVING CONTROL METHOD FOR AUTONOMOUS VEHICLE, DEVICE, AND MEDIUM

CROSS-REFERENCE TO RELATED APPLICATION

This application claims priority to and benefits of Chinese Patent Application Serial No. 202010102674.8, filed the State Intellectual Property Office of P. R. China on Feb. 19, 2020, the entire content of which is incorporated herein by reference.

TECHNICAL FIELD

The present disclosure relates to a field of computer technologies, and more particularly, to a field of perception and autonomous driving technologies.

BACKGROUND

With development of autonomous driving technologies, more autonomous vehicles are developed and put into use as cheap, flexible and productive means of transportation. Currently, it is important to ensure driving safety of autonomous vehicles, especially on accident-prone curved roads, and it is required to avoid obstacles in time and accurately to ensure the driving safety of autonomous vehicles on a curved road.

SUMMARY

Embodiments of the present disclosure provide a bend driving control method for an autonomous vehicle. The method includes: obtaining an occupancy width of an autonomous vehicle on a target bend when the autonomous vehicle drives on the target bend; detecting location information of an obstacle on the target bend; and controlling a driving route of the autonomous vehicle on the target bend based on the occupancy width and the location information of the obstacle.

Embodiments of the present disclosure provide an electronic device. The electronic device includes: at least one processor and a memory communicatively connected to the at least one processor. The memory stores instructions executable by the at least one processor, and when the instructions are executed by the at least one processor, the at least one processor is caused to execute the bend driving control method for an autonomous vehicle according to embodiments of the first aspect.

Embodiments of the present disclosure provide a non-transitory computer-readable storage medium having computer instructions stored thereon. The computer instructions are used to make a computer execute the bend driving control method for an autonomous vehicle according to embodiments of the first aspect.

Additional effects of the above-mentioned optional manners will be described below in combination with specific embodiments.

BRIEF DESCRIPTION OF THE DRAWINGS

The accompanying drawings are used to better understand the solution, and do not constitute a limitation on the application, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Currently, it is important to ensure driving safety of autonomous vehicles, especially on accident-prone curved roads, and it is required to avoid obstacles in time and accurately to ensure the driving safety of autonomous vehicles on a curved road. To solve this problem, the existing methods for avoiding obstacles on the curved road mainly use detection devices such as laser radars or through image recognition to detect the location information of the obstacles on the curved roads, so as to control the autonomous vehicle to successfully avoid the obstacles.

The existing obstacle avoidance methods for curved roads mainly focus on the location information of the obstacles, rather than specific driving conditions of the autonomous vehicle when driving on the curved road, so that even if the locations of the obstacles are known, the obstacle avoidance may fail as no adaptive control is made based on the specific driving conditions of the autonomous vehicle, which reduces the driving safety of the autonomous vehicle on the curved roads.

Embodiment 1

Figure 1A:
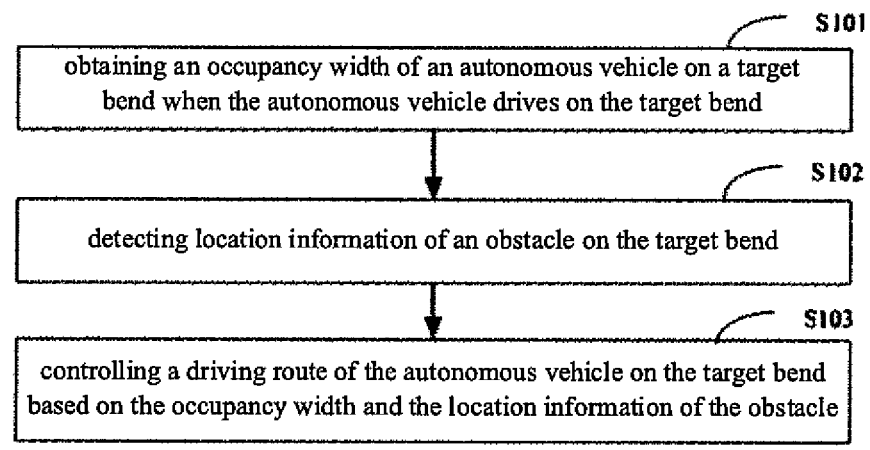
FIG. 1a is a flowchart of a bend driving control method for an autonomous vehicle according to Embodiment 1 of the present disclosure.

FIG. 1a is a flowchart of a bend driving control method for an autonomous vehicle according to Embodiment 1 of the present disclosure. This embodiment of the present disclosure is applicable to a situation of controlling a driving route of an autonomous vehicle to avoid an obstacle when the autonomous vehicle drives on a bend (i.e., a curved road). The method may be executed by a bend driving control apparatus of the autonomous vehicle. The control apparatus is implemented by software and/or hardware, and is specifically configured in an electronic device with certain data computing capabilities. The electronic device is specifically configured in the autonomous vehicle or independent of the autonomous vehicle.

As illustrated in FIG. 1a, the bend driving control method for an autonomous vehicle includes the following actions.

At block S101, an occupancy width of an autonomous vehicle on a target bend is obtained when the autonomous vehicle drives on the target bend.

In an embodiment, a bend to be driven on by the autonomous vehicle is called the target bend. According to the existing path planning of autonomous vehicles, when the autonomous vehicle drives on the target bend, a center of the autonomous vehicle is located on a center line of the target bend. Under this precondition, the occupancy width of the autonomous vehicle on the target bend includes the widths of both sides of the target bend, which is divided into left-side occupancy width and right-side occupancy width based on a driving direction of the autonomous vehicle. Certainly, the left or right side of the autonomous vehicle may be located on the center line of the target bend. At this time, the occupancy width of the autonomous vehicle on the target bend includes occupancy width at one side of the target bend.

Figure 1B:
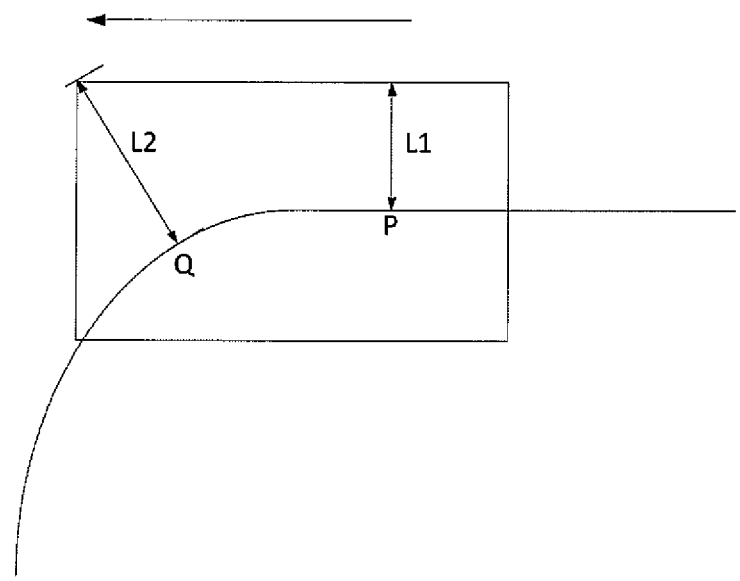
FIG. 1B is a schematic diagram illustrating an occupancy width of an autonomous vehicle on a target bend according to Embodiment 1 of the present disclosure.

Since the target bend is in a curved state, the occupancy width of the autonomous vehicle on the target bend is width of an area swept by the autonomous vehicle and perpendicular to the target bend. Obviously, the occupancy width of the autonomous vehicle on the target bend is larger than the occupancy width of the autonomous vehicle on a straight road. FIG. 1B is a schematic diagram illustrating the occupancy width of the autonomous vehicle on the target bend according to Embodiment 1 of the present disclosure. The autonomous vehicle is represented by a rectangle, and the driving direction is to the left. The first half of the autonomous vehicle is on the target bend, and the second half of the autonomous vehicle is on the straight road. The right-side occupancy width corresponding to point P on the straight road is L1, which is equal to a half of the width of the autonomous vehicle. The right-side occupancy width corresponding to point Q on the bend is L2, which is obviously greater than a half of the width of the vehicle. In order to ensure that the autonomous vehicle successfully avoids an obstacle, the width (i.e., the occupancy width) of the area occupied on the target bend by the autonomous vehicle is used for obstacle avoidance instead of a half of the width of the vehicle.

Optionally, distance sensors are configured around the autonomous vehicle, such as lasers or ultrasonic sensors. When the autonomous vehicle drives on the target bend, a distance between an edge of the autonomous vehicle and the center line of the target bend is measured by the distance sensors to obtain the occupancy width on the target bend.

At block S102, location information of an obstacle on the target bend is detected.

Optionally, when the autonomous vehicle drives on the target bend, the location information of the obstacle on the target bend is detected in real time. The detection method includes, but is not limited to: taking an image of the front of the autonomous vehicle, identifying a location of the obstacle in the image, and mapping the location to the real world; or using laser or ultrasound to detect the location information of the obstacle on the target bend. This embodiment does not limit the method for detecting the location information of the obstacle, and any method capable of detecting the location information of the obstacle may be applicable in this embodiment.

At block S103, a driving route of the autonomous vehicle on the target bend is controlled according to the occupancy width and the location information of the obstacle.

In this embodiment, the driving route is controlled by controlling the speed and steering of the autonomous vehicle. By controlling the driving route, the obstacle is located outside the width occupied by the autonomous vehicle, so that the obstacle is successfully avoided.

It is understood that, in order to control the driving route of the autonomous vehicle with the location information together with the occupancy width, the location information of the obstacle and the occupancy width of the autonomous vehicle may adopt a same starting position. If the starting point of the occupancy width of the autonomous vehicle is the center line of the target bend, the starting point of the location information of the obstacle is the center line of the target bend.

Optionally, an obstacle avoidance distance of the autonomous vehicle driving on the target bend is determined according to the occupancy width. The driving route of the autonomous vehicle on the target bend is controlled based on the location information of the obstacle, so that a lateral distance between the autonomous vehicle and the obstacle exceeds the obstacle avoidance distance.

In detail, the occupancy width or a multiple of the occupancy width greater than 1 may be used as the obstacle avoidance distance. When the center of the autonomous vehicle is located in the center line of the target bend, and the location information of the obstacle also takes the center line of the target bend as the starting point, the lateral distance between the autonomous vehicle and the obstacle is actually the distance between the obstacle and the center line of the target bend. When the lateral distance between the autonomous vehicle and the obstacle exceeds the obstacle avoidance distance, the driving safety is ensured.

In the embodiments of the present disclosure, it is fully considered that the autonomous vehicle occupies an area with a larger width on a bend than on a straight road, and the width of the area actually occupied on the bend by the autonomous vehicle when the autonomous vehicle drives on the target bend is obtained and adopted, instead of a body width of the autonomous vehicle. By detecting the location information of the obstacle, and the driving route of the autonomous vehicle is controlled based on the occupancy width and the location information of the obstacle, that is, adaptive route control is performed according to the width of the area actually occupied by the autonomous vehicle. Therefore, obstacle avoidance ability of the autonomous vehicle is improved, and safety of driving on the bend is ensured.

Further, according to the width of the area actually occupied by the autonomous vehicle, the obstacle avoidance distance is determined, and the lateral distance between the autonomous vehicle and the obstacle is controlled to exceed the obstacle avoidance distance, thus ensuring that the obstacle is beyond the obstacle avoidance distance, thereby effectively avoiding collision between the obstacle and the autonomous vehicle.

Embodiment 2

Figure 2A:
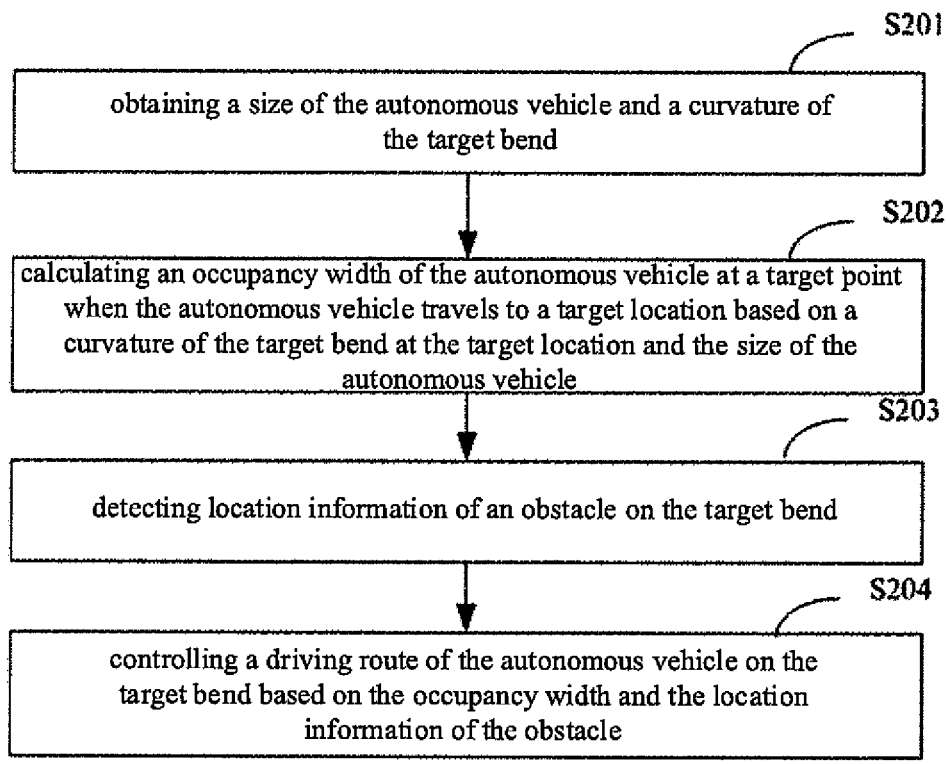
FIG. 2a is a flowchart of a bend driving control method for an autonomous vehicle according to Embodiment 2 of the present disclosure.

FIG. 2a is a flowchart of a bend driving control method for an autonomous vehicle according to Embodiment 2 of the present disclosure. The embodiments of the present disclosure are on the basis of the technical solution of the foregoing embodiments.

Further, the operation of "obtaining the occupancy width of the autonomous vehicle on the target bend when the autonomous vehicle drives on the target bend" is refined into "obtaining a size of the autonomous vehicle and a curvature of the target bend; and determining the occupancy width based on the size of the autonomous vehicle and the curvature of the target bend", so as to improve the efficiency of calculating the width.

The larger the size of the autonomous vehicle, the larger the occupancy width of the autonomous vehicle on the target bend. The curvature of the target bend represents a degree of bending of the target bend, which is represented by a curvature of the target bend at the center of the autonomous vehicle. The greater the curvature, the larger the occupancy width on the target bend. In this embodiment, geometric algorithm is adopted to calculate the occupancy width of the autonomous vehicle according to the size of the autonomous vehicle and the curvature of the target bend, simplifying the calculation method, requiring low operational capability, and improving calculation efficiency, so that when the autonomous vehicle drives on the bend, the occupancy width may be obtained in time to immediately control the driving route, thus improving the safety of driving on the bend.

In an actual situation, due to an irregular shape of the autonomous vehicle, the sizes of respective portions are different, the sizes of respective portions of the autonomous vehicle needs to be unified. Thereby, a maximum vehicle width and a maximum vehicle length of the autonomous vehicle are obtained, and a size of a circumscribed rectangle of the autonomous vehicle is determined as the size of the autonomous vehicle according to the maximum vehicle width and the maximum vehicle length.

By adopting the size of the circumscribed rectangle of the autonomous vehicle as the size of the autonomous vehicle, calculating the occupancy width of the autonomous vehicle is calculating the occupancy width of the circumscribed rectangle of the autonomous vehicle, thus the occupancy width of the autonomous vehicle is obtained to the greatest extent, and the obstacle avoidance ability of the autonomous vehicle is further improved.

Further, the operation of "determining the occupancy width based on the size of the autonomous vehicle and the curvature of the target bend" is refined into "calculating an occupancy width of the autonomous vehicle at a target point when the autonomous vehicle travels to a target location based on a curvature of the target bend at the target location and the size of the autonomous vehicle, in which the target point is a projection point of a corner point of the autonomous vehicle on the target bend when the autonomous vehicle travels to the target location of the target bend". By taking the target point on the target bend as granularity, the calculation efficiency is further improved.

As illustrated in FIG. 2a, the bend driving control method for an autonomous vehicle includes the following actions.

At block S201, a size of the autonomous vehicle and a curvature of the target bend are obtained.

The method for obtaining the size of the autonomous vehicle is detailed in the above description, which will not be repeated here.

The method of obtaining the curvature of the target bend includes: selecting any point on the target bend as a projection point of a corner point of the autonomous vehicle on the target bend; initializing the curvature of the target bend; calculating a center position of the autonomous vehicle, a tangent direction corresponding to a driving direction of the autonomous vehicle at the target location, and location of an intersection of an edge at a corner side of the autonomous vehicle and the target bend based on a position of the target point, the curvature of the target bend at the target location and the size of the autonomous vehicle; calculating an angle between the tangent direction and a line connecting the center position and the intersection; and updating the curvature of the target bend at the target location with the angle, and repeating the calculation of the center position, the tangent direction and the location of the intersection until a preset iteration condition is satisfied.

Optionally, firstly, a coordinate point set of the target bend is extracted from an electronic map to obtain the target bend. In order to facilitate the calculation, the coordinate point set is subjected to smoothing process to obtain a smooth curve. This curve is also a driving trajectory of the autonomous vehicle, or the center line of the target bend.

Figure 2B:
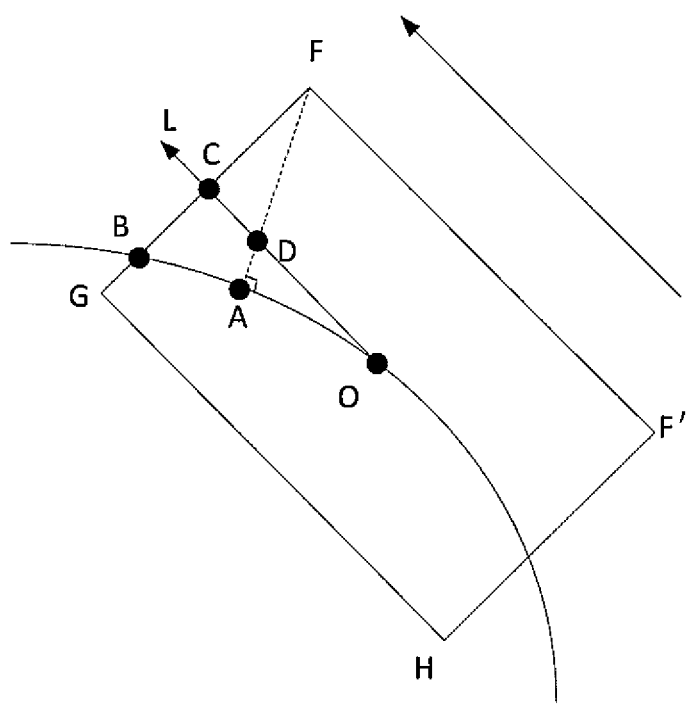
FIG. 2b is a schematic diagram illustrating an autonomous vehicle located on a center line of a target bend according to Embodiment 2 of the present disclosure.

FIG. 2b is a schematic diagram illustrating the autonomous vehicle located on the center line of the target bend according to Embodiment 2 of the present disclosure. The target point, i.e., point A, is any point selected from the center line of the target bend. In detail, the target point may be any point selected from the coordinate point set of the target bend. Point A is a projection point of a corner point F of the autonomous vehicle on the target bend when the autonomous vehicle travels to the target location on the target bend. The target location may be the center point of the autonomous vehicle, that is, point O. The corner point of the autonomous vehicle is actually a protruding point on an edge of the autonomous vehicle. In a case of adopting the size of the circumscribed rectangle of the autonomous vehicle as shown in FIG. 2b, the corner point may be any right angle of the rectangle, and the point F in FIG. 2b is a front corner point of the autonomous vehicle. In addition, FIG. 2b also illustrates a tangent line L at point O, and an intersection location (point B) of an edge at a front corner side of the autonomous vehicle and the target bend. Moreover, FIG. 2b also illustrates a center point of the edge at the front corner side of the autonomous vehicle, which is also an intersection point of the tangent line L and the edge at the front corner side, namely point C. The line segment OC and the line segment AF intersect at point D.

It is understood that the edge at the corner side of the autonomous vehicle is an edge at a side where a corner point is located. Two edges FG and FF' are connected at the corner point F, but only one of the two edges intersects with the target bend, that is, the edge FG in FIG. 2b intersects with the target bend.

In this embodiment, a curvature at the point O is calculated on the premise that the coordinate point set of the target bend is known and the point A is selected from the coordinate point set. Considering that the body of the autonomous vehicle is short and the curvature of the target bend is limited, a curvature of arc BAO is assumed to be small and the arc BAO is similar to a straight line, then there is equation (1):

$$\angle BOC = \varphi BFA = \varphi 1; \quad (1)$$

In the equation (1), $\angle 1$ is an angle between the tangent line L and a connection line between point O and point B, and $\angle 1$ is regarded as the curvature at point O.

Firstly, $\angle 1$ is initialized to 0, as 0 is close to an actual curvature and requires fewer iterations. It should be noted that the essence of this step is to initialize an angle to 0, and a target location, i.e., point O, where the angle is located is unknown.

Then, according to geometric knowledge, there are equation (2):

$$OA = OD \times \cos \angle 1 = (OC - FC \times \tan \varphi 1) \times \cos \varphi 1; \quad (2)$$

Where, OC is a half of the length of the autonomous vehicle, FC is a half of the width of the autonomous vehicle, and OC and FC are determined according to the size of the circumscribed rectangle of the autonomous vehicle.

Next, point O is calculated. Point O is a point on the target bend whose distance with point A in a direction opposite to the driving direction is OA. In order to simplify the calculation, the S-axis of the Frenet coordinate system is used to represent the target bend. Based on this, point O is a point whose S value (denoted as $S_O$) is smaller than S value (denoted as $S_A$) of point A by the value of OA, that is, $S_A - S_O = OA$. Knowing the target bend and the point O on the target bend, the direction of the tangent line L corresponding to the driving direction at the point O is calculated. The driving direction in FIG. 2b is upward, indicated by an arrow, and the direction of the tangent line L, i.e., the tangent direction, is a direction of a vector $\overrightarrow{OC}$.

Then, point B is calculated as a point on the target bend that has an S value greater than that of point O by $$\frac{OC}{\cos \angle 1}.$$

$\angle 1$ is updated according to equation (3), in which:

$$\cos \angle 1 = \frac{\overrightarrow{OB} \cdot \overrightarrow{OC}}{|OB| \cdot |OC|}; \quad (3)$$

Operations of calculating the point O, the direction of the tangent line L, and the point B are repeated until the preset iteration conditions are met. The preset iteration conditions include: a preset the number of iterations or $\angle 1$ reaching a convergence accuracy. Experiments show that $\angle 1$ is not too large, the initial value 0 is relatively close to the convergence value, and the requirement for calculation accuracy is not high, thus about 5 iterations may be performed to meet the preset iteration condition.

Figure 2C:
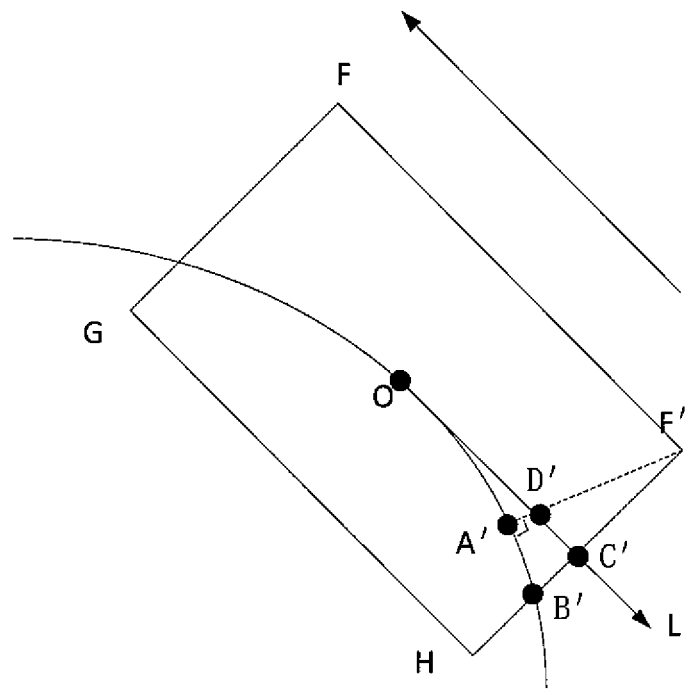
FIG. 2c is schematic diagram of an autonomous vehicle located on a center line of a target bend according to Embodiment 2 of the present disclosure.

FIG. 2c is another schematic diagram illustrating the autonomous vehicle located on the center line of the target bend according to Embodiment 2 of the present disclosure. As illustrated in FIG. 2c, a driving direction of the autonomous vehicle is upward, and a selected target point is point A'. Point A' is a projection point of a rear corner point F' on the target bend when the autonomous vehicle travels to point O. A tangent line at point O is L, and a direction of the tangent line L is a direction of the vector $\overrightarrow{OC'}$. An intersection location of an edge F'H at a rear corner side of the autonomous vehicle and the target bend is at point B'. A center point of the edge at the rear corner side of the autonomous vehicle is also an intersection point C' of the tangent line L and the edge F'H at the rear corner side. Line segment OC' and line segment A'F' are intersected at point D'. According to the above method, similarly, $\angle B'OC'$ may be obtained, that is, the curvature $\angle 1'$ of the target bend at point A' may be obtained.

In this embodiment, geometric algorithms and multiple iterations are adopted to calculate the curvature at the target location, the calculation difficulty is reduced through the adjustable iteration design.

At block S202, an occupancy width of the autonomous vehicle at a target point when the autonomous vehicle travels to a target location is determined according to the size of the autonomous vehicle and a curvature of the target bend at the target location.

Considering that a curve direction of the target bend may be to the left or right, a left-side occupancy width at the target point varies with the curve direction, and a right-side occupancy width at the target point varies with the curve direction. Based on this, the curve direction of the target bend at the target location corresponding to the driving direction is determined. Optionally, a first tangent direction corresponding to the driving direction at the target location and a second tangent direction corresponding to the driving direction at the target point are determined, and the curve direction is determined according to the angle relation between the first tangent direction and the second tangent direction.

When the target bend and the target location are known, the tangent direction corresponding to the driving direction at the target location is obtained, which is called the first tangent direction. When the target bend and the target point are known, the tangent direction corresponding to the driving direction at the target point is obtained, which is called the second tangent direction.

When the target point is the projection point of the front corner point of the autonomous vehicle on the target bend, if an angle from the first tangent direction clockwise to the second tangent direction is smaller than an angle from the first tangent direction counterclockwise to the second tangent direction, it is determined that the curve direction is to the right; if the angle from the first tangent direction clockwise to the second tangent direction is greater than the angle from the first tangent direction counterclockwise to the second tangent direction, it is determined that the curve direction is to the left, as illustrated in FIG. 2b.

When the target point is the projection point of the rear corner point of the autonomous vehicle on the target bend, if an angle from the first tangent direction clockwise to the second tangent direction is smaller than the angle from the first tangent direction counterclockwise to the second tangent direction, it is determined that the curve direction is to be left, as illustrated in FIG. 2c; if the angle from the first tangent direction clockwise to the second tangent direction is greater than the angle from the first tangent direction counterclockwise to the second tangent direction, it is determined that the curve direction is to the right.

In this embodiment, the geometric algorithm is used to determine the curve direction according to the tangent directions at the target location and the target point, without using sensors such as gyroscopes to detect the curve direction, thus hardware costs are saved. Meanwhile, the amount of calculation is reduced and the calculation efficiency is improved. Therefore, when the autonomous vehicle drives on the bend, the occupancy width is obtained in time to immediately control the driving route to improve the safety of driving on the bend.

Further, if the curve direction is to the left, the right-side occupancy width of the autonomous vehicle at the target point on the target bend when the autonomous vehicle travels to the target location is calculated according to the curvature of the target bend at the target location and the size of the autonomous vehicle, and the left-side occupancy width of the autonomous vehicle at the target point on the target bend when the autonomous vehicle travels to the target location is determined based on a half of the width of the autonomous vehicle. As illustrated in FIG. 2b and FIG.

2c, equations (4) and (5) respectively give the right-side occupancy width W_R and the left-side occupancy width W_L of the area occupied at point A when the curve direction is to the left, and equations (6) and (7) respectively give the right-side occupancy width W'_R and the left-side occupancy width W'_L of the area occupied at point A' when the curve direction is to the left.

$$W\_R = \frac{FC}{\cos\angle 1} + (OC - FC \times \tan\angle 1) \times \sin\angle 1; \quad (4)$$

$$W\_L = FC; \quad (5)$$

$$W'\_R = \frac{F'C'}{\cos\angle 1'} + (OC' - F'C' \times \tan\angle 1') \times \sin\angle 1'; \quad (6)$$

$$W'\_L = F'C'; \quad (7)$$

Contrary to the case when the curve direction is to the left, if the curve direction is to the right, the left-side occupancy width of the autonomous vehicle at the target point on the target bend when the autonomous vehicle travels to the target location is determined according to the curvature of the target bend at the target location and the size of the autonomous vehicle, and details are illustrated in equations (4) and (6). The right-side occupancy width of the autonomous vehicle at the target point on the target bend when the autonomous vehicle travels to the target location is determined based on a half of the width of the autonomous vehicle, and details are illustrated in equations (5) and (7).

Further, when the corner points are the front corner point and the rear corner point, the occupancy widths obtained when the corner point is the front corner point and when the corner point is the rear corner point may be different. For example, the results obtained by equations (4) and (6) may be different, thereby, the larger width is selected as the final occupancy width after the occupancy widths are calculated according to different situations.

In an optional implementation of the present disclosure, considering that the curve direction of the target bend may be to the left or right, the left-side occupancy width and the right-side occupancy width when the curve direction is to the left and the left-side occupancy width and the right side occupancy width when the curve direction is to the right are respectively calculated to calculate the occupancy width of the autonomous vehicle according to the situation, so that when the target bend bends to the left or to the right, the obstacle avoidance ability of the vehicle may be improved.

In detail, if the target point is the projection point of the front corner point on the target bend, a first width of occupancy of the autonomous vehicle at the target point on the target bend when the autonomous vehicle travels to the target location is calculated based on the curvature of the target bend at the target location and the size of the autonomous vehicle, such as the results obtained from equations (4) and (5) according to the curvature at the target location and the size of the autonomous vehicle. If the target point is the projection point of the rear corner point on the target bend, a second width of occupancy of the autonomous vehicle at the target point on the target bend when the autonomous vehicle travels to the target location is calculated according to the curvature of the target bend at the target location and the size of the autonomous vehicle, such as the results obtained from equations (6) and (7). The occupancy width of the autonomous vehicle at the target point on the target bend when the autonomous vehicle travels to the target location is determined according to a larger one of the first width and the second width. In detail, the maximum left-side occupancy width and the maximum right-side occupancy width are selected respectively and determined as the final occupied widths.

In an optional implementation of the present disclosure, considering that the obtained occupancy width may be different when the target point is the projection point of the front corner point and when the target point is the projection point of the rear corner point, the occupancy widths are respectively calculated when the target point is the projection point of the front corner point and when the target point is the projection point of the rear corner point to obtain the maximum occupancy width.

At block S203, location information of an obstacle on the target bend is detected.

At block S204, a driving route of the autonomous vehicle on the target bend is controlled according to the occupancy width and the location information of the obstacle.

In the embodiment, by taking the target point on the target bend as granularity, the occupancy width at any target point is calculated to obtain the occupancy width on the entire target bend. The occupancy width is calculated according to the size of the autonomous vehicle and the curvature by adopting the projection point of the corner point of the autonomous vehicle on the target bend, without corresponding calculation of other corner points, thereby reducing the calculation amount and improving the calculation efficiency, so that when the autonomous vehicle drives on the bend, the occupancy width is obtained in time to immediately control the driving route, thus improving the safety of driving on the bend.

Embodiment 3

Figure 3:
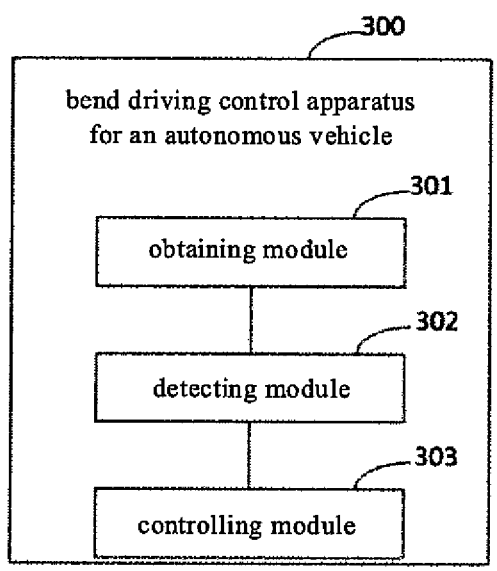
FIG. 3 is a block diagram of a bend driving control apparatus for an autonomous vehicle according to Embodiment 3 of the present disclosure.

FIG. 3 is a block diagram of a bend driving control apparatus for an autonomous vehicle according to Embodiment 3 of the present disclosure. The embodiment of the disclosure is applicable to a situation of controlling a driving route of an autonomous vehicle to avoid an obstacle when the autonomous vehicle drives on a bend. The apparatus is implemented by software and/or hardware, and is specifically configured in an electronic device with certain data computing capabilities.

As illustrated in FIG. 3, a bend driving control apparatus 300 for an autonomous vehicle includes: an obtaining module 301, a detecting module 302 and a controlling module 303.

The obtaining module 301 is configured to obtain an occupancy width of an autonomous vehicle on a target bend when the autonomous vehicle drives on the target bend.

The detecting module 302 is configured to detect location information of an obstacle on the target bend.

The controlling module 303 is configured to control a driving route of the autonomous vehicle on the target bend based on the occupancy width and the location information of the obstacle.

In the embodiments of the present disclosure, it is fully considered that the autonomous vehicle occupies a larger width on a bend than on a straight road, and the width actually occupied on the bend by the autonomous vehicle when the autonomous vehicle drives on the target bend is obtained and adopted, instead of a body width of the autonomous vehicle. By detecting the location information of the obstacle, and the driving route of the autonomous vehicle is controlled based on the occupancy width and the location information of the obstacle, that is, adaptive route control is performed according to the actual width occupied by the autonomous vehicle. Therefore, obstacle avoidance ability of the autonomous vehicle is improved, and safety of driving on the bend is ensured.

The controlling module 303 is further configured to determine an obstacle avoidance distance of the autonomous vehicle driving on the target bend according to the occupancy width, and to control the driving route of the autonomous vehicle on the target bend based on the location information of the obstacle, so that a lateral distance between the autonomous vehicle and the obstacle exceeds the obstacle avoidance distance.

Further, the obtaining module 301 includes a size and curvature obtaining unit and a width calculation unit. The size and curvature obtaining unit is configured to obtain a size of the autonomous vehicle and a curvature of the target bend. The width calculation unit is configured to determine the occupancy width based on the size of the autonomous vehicle and the curvature of the target bend.

Moreover, the width calculation unit is configured to calculate an occupancy width of the autonomous vehicle at a target point when the autonomous vehicle travels to a target location based on a curvature of the target bend at the target location and the size of the autonomous vehicle. The target point is a projection point of a corner point of the autonomous vehicle on the target bend when the autonomous vehicle travels to the target location of the target bend.

Moreover, the corner point includes a front corner point and a rear corner point. When calculating the occupancy width of the autonomous vehicle at the target point when the autonomous vehicle travels to the target location based on the curvature of the target bend at the target location and the size of the autonomous vehicle, the width calculation unit is configured to: calculate a first width of occupancy of the autonomous vehicle at the target point when the autonomous vehicle travels to the target location based on the curvature at the target location and the size of the autonomous vehicle if the target point is a projection point of the front corner point on the target bend; calculate a second width of occupancy of the autonomous vehicle at the target point when the autonomous vehicle travels to the target location based on the curvature at the target location and the size of the autonomous vehicle if the target point is a projection point of the rear corner point on the target bend; and calculate the occupancy width of the autonomous vehicle at the target point when the autonomous vehicle travels to the target location based on a larger one of the first width and the second width.

Moreover, when obtaining the curvature of the target bend, the size and curvature obtaining unit is configured to: select any target point on the target bend; initialize a curvature of the target bend at the target location; calculate the target location, a tangent direction corresponding to a driving direction at the target location, and location of an intersection of an edge at a corner side of the autonomous vehicle and the target bend based on a position of the target point, the curvature of the target bend at the target location and the size of the autonomous vehicle; calculate an angle between the tangent direction and a line connecting the target location and the intersection; and the curvature of the target bend at the target location with the angle, and repeat the calculation of the target location, the tangent direction and the location of the intersection until a preset iteration condition is satisfied.

Furthermore, when calculating the occupancy width of the autonomous vehicle at the target point when the autonomous vehicle travels to the target location based on the curvature of the target bend at the target location and the size of the autonomous vehicle, the width calculation unit is configured to: obtain a curve direction of the target bend in a driving direction at the target location; if the curve direction is to the left, calculating a right-side occupancy width of the autonomous vehicle at the target point when the autonomous vehicle travels to the target location based on the curvature of the target bend at the target location and the size of the autonomous vehicle, and determine a left-side occupancy width of the autonomous vehicle at the target point when the autonomous vehicle travels to the target location based on a half of a width of the autonomous vehicle; and if the curve direction is to the right, calculate a left-side occupancy width of the autonomous vehicle at the target point when the autonomous vehicle travels to the target location based on the curvature of the target bend at the target location and the size of the autonomous vehicle, and determine a right-side occupancy width of the autonomous vehicle at the target point when the autonomous vehicle travels to the target location based on a half of the width of the autonomous vehicle.

When obtaining the curve direction of the target bend in the driving direction at the target location, the width calculation unit is configured to: obtain a first tangent direction corresponding to a driving direction at the target location and a second tangent direction corresponding to a driving direction at the target point; and determine the curve direction according to an angle relation between the first tangent direction and the second tangent direction.

Moreover, when obtaining the size of the autonomous vehicle, the size and curvature obtaining unit is configured to: obtain a maximum vehicle width and a maximum vehicle length of the autonomous vehicle; and determine a size of a circumscribed rectangle of the autonomous vehicle as the size of the autonomous vehicle according to the maximum vehicle width and the maximum vehicle length.

The above-mentioned bend driving control apparatus for an autonomous vehicle may execute the bend driving control method for an autonomous vehicle according to any embodiment of the present disclosure, and has functional modules and beneficial effects corresponding to the bend driving control method for an autonomous vehicle.

Embodiment 4

According to the embodiments of the present disclosure, the present disclosure also provides an electronic device and a readable storage medium.

Figure 4:
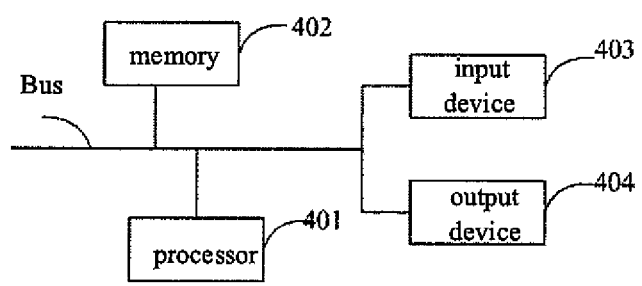
FIG. 4 is a block diagram of an electronic device used to implement a bend driving control method for an autonomous vehicle according to an embodiment of the present disclosure.

FIG. 4 is a block diagram of an electronic device used to implement a bend driving control method for an autonomous vehicle according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 4, the electronic device includes: one or more processors 401, a memory 402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). One processor 401 is taken as an example in FIG. 4.

The memory 402 is a non-transitory computer-readable storage medium according to the present disclosure. The memory stores instructions executable by at least one processor, so that the at least one processor executes the bend driving control method for an autonomous vehicle according to the present disclosure. The non-transitory computer-readable storage medium of the present disclosure stores computer instructions, which are used to cause a computer to execute the bend driving control method for an autonomous vehicle according to the present disclosure.

As a non-transitory computer-readable storage medium, the memory 402 is configured to store non-transitory software programs, non-transitory computer executable programs and modules, such as program instructions/modules corresponding to the bend driving control method for an autonomous vehicle in the embodiment of the present disclosure (For example, the obtaining module 301, the detecting module 302, and the controlling module 303 shown in FIG. 3). The processor 401 executes various functional applications and data processing of the server by running non-transitory software programs, instructions, and modules stored in the memory 402, that is, implementing the bend driving control method for an autonomous vehicle in the foregoing method embodiment.

The memory 402 may include a storage program area and a storage data area, where the storage program area may store an operating system and application programs required for at least one function. The storage data area may store data created according to the use of the electronic device, and the like. In addition, the memory 402 may include a high-speed random access memory, and a non-transitory memory, such as at least one magnetic disk storage device, a flash memory device, or other non-transitory solid-state storage device. In some embodiments, the memory 402 may optionally include a memory remotely disposed with respect to the processor 401, and these remote memories may be connected to the electronic device through a network. Examples of the above network include, but are not limited to, the Internet, an intranet, a local area network, a mobile communication network, and combinations thereof.

The electronic device for implementing the bend driving control method for an autonomous vehicle may further include: an input device 403 and an output device 404. The processor 401, the memory 402, the input device 403, and the output device 404 may be connected through a bus or in other manners. In MG. 4, the connection through the bus is taken as an example.

The input device 403 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 404 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the embodiments, it is fully considered that the autonomous vehicle occupies a larger width on a bend than on a straight road, and the width actually occupied on the bend by the autonomous vehicle when the autonomous vehicle drives on the target bend is obtained and adopted, instead of a body width of the autonomous vehicle. By detecting the location information of the obstacle, and the driving route of the autonomous vehicle is controlled based on the occupancy width and the location information of the obstacle, that is, adaptive route control is performed according to the actual width occupied by the autonomous vehicle. Therefore, obstacle avoidance ability of the autonomous vehicle is improved, and safety of driving on the bend is ensured.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A bend driving control method for an autonomous vehicle, comprising:
    obtaining a size of the autonomous vehicle and a curvature of a target bend; and
    determining, based on the size of the autonomous vehicle and the curvature of the target bend, an occupancy width of the autonomous vehicle on the target bend when the autonomous vehicle drives on the target bend;
    detecting location information of an obstacle on the target bend; and
    controlling a driving route of the autonomous vehicle on the target bend based on the occupancy width and the location information of the obstacle;
    wherein obtaining the curvature of the target bend comprises:
    selecting any point on the target bend as a projection point of a corner point of the autonomous vehicle on the target bend;
    initializing the curvature of the target bend;
    determining a center position of the autonomous vehicle, tangent direction corresponding to a driving direction of the autonomous vehicle at the target location, and the location of an intersection of an edge at a corner side of the autonomous vehicle and the target bend based on a position of the target point, the curvature of the target bend at the target location and the size of the autonomous vehicle;
    determining an angle between the tangent direction and a line connecting the center position and the intersection; and
    updating the curvature of the target bend at the target location with the angle, and repeating the calculation of the center position, the tangent direction and the location of the intersection until a preset iteration condition is satisfied.

2. The method according to claim 1, wherein controlling the driving route of the autonomous vehicle on the target bend based on the occupancy width and the location information of the obstacle comprises:
    determining ab obstacle avoidance distance of the autonomous vehicle driving on the target bend according to the occupancy width; and
    controlling the driving route of the autonomous vehicle on the target bend based on the location information of the obstacle, so that a lateral distance between the autonomous vehicle and the obstacle exceeds the obstacle avoidance distance.

3. The method according to claim 1, wherein determining the occupancy width based on the size of the autonomous vehicle and the curvature of the target bend comprises:
    determining an occupancy width of the autonomous vehicle at a target point when the autonomous vehicle travels to a target location based on a curvature of the target bend at the target location and the size of the autonomous vehicle,
    wherein, the target point is a projection point of a corner point of the autonomous vehicle on the target bend when the autonomous vehicle travels to the target location of the target bend.

4. The method according to claim 3, wherein the corner point comprises a front corner point and a rear corner point; and
    determining the occupancy width of the autonomous vehicle at the target point when the autonomous vehicle travels to the target location based on the curvature of the target bend at the target location and the size of the autonomous vehicle, comprises:
    in response to determining that the target point is a projection point of the front corner point on the target bend, determining a first width of occupancy of the autonomous vehicle at the target point when the autonomous vehicle travels to the target location based on the curvature of the target bend at the target location and the size of the autonomous vehicle;
    in response to determining that the target point is a projection point of the rear corner point on the target bend, determining a second width of occupancy of the autonomous vehicle at the target point when the autonomous vehicle travels to the target location based on the curvature of the target bend at the target location and the size of the autonomous vehicle; and
    determining the occupancy width of the autonomous vehicle at the target point when the autonomous vehicle travels to the target location based on a larger one of the first width and the second width.

5. The method according to claim 3, wherein determining the occupancy width of the autonomous vehicle at the target point when the autonomous vehicle travels to the target location based on the curvature of the target bend at the target location and the size of the autonomous vehicle, comprises:
    obtaining a curve direction of the target bend in a driving direction at the target location;
    in response to determine that the curve direction is to the left, determining a right-side occupancy width of the autonomous vehicle at the target point when the autonomous vehicle travels to the target location based on the curvature of the target bend at the target location and the size of the autonomous vehicle, and determining a left-side occupancy width of the autonomous vehicle at the target point when the autonomous vehicle travels to the target location based on a half of a width of the autonomous vehicle; and in response to determine that the curve direction is to the right, determining a left-side occupancy width of the autonomous vehicle at the target point when the autonomous vehicle travels to the target location based on the curvature of the target bend at the target location and the size of the autonomous vehicle, and determining a right-side occupancy width of the autonomous vehicle at the target point when the autonomous vehicle travels to the target location based on a half of the width of the autonomous vehicle.

6. The method according to claim 5, wherein obtaining the curve direction of the target bend in the driving direction at the target location comprises:

obtaining a first tangent direction at the target location and a second tangent direction at the target point; and determining the curve direction according to an angle relation between the first tangent direction and the second tangent direction.

7. The method according to claim 1, wherein obtaining the size of the autonomous vehicle comprises:

obtaining a maximum vehicle width and a maximum vehicle length of the autonomous vehicle; and determining a size of a circumscribed rectangle of the autonomous vehicle as the size of the autonomous vehicle according to the maximum vehicle width and the maximum vehicle length.

8. An electronic device, comprising:

at least one processor; and a memory communicatively connected to the at least one processor; wherein, the memory having instructions executable by the at least one processor stored thereon, and when the instructions are executed by the at least one processor, the at least one processor is caused to execute a bend driving control method for an autonomous vehicle, the method comprising:

obtaining a size of the autonomous vehicle and a curvature of a target bend; and determining, based on the size of the autonomous vehicle and the curvature of the target bend, an occupancy width of the autonomous vehicle on the target bend when the autonomous vehicle drives on the target bend;

detecting location information of an obstacle on the target bend; and controlling a driving route of the autonomous vehicle on the target bend based on the occupancy width and the location information of the obstacle;

wherein obtaining the curvature of the target bend comprises:

selecting any point on the target bend as a projection point of a corner point of the autonomous vehicle on the target bend;

initializing the curvature of the target bend;

determining a center position of the autonomous vehicle, a tangent direction corresponding to a driving direction of the autonomous vehicle at the target location, and location of an intersection of an edge at a corner side of the autonomous vehicle and the target bend based on a position of the target point, the curvature of the target bend at the target location and the size of the autonomous vehicle;

determining an angle between the tangent direction and a line connecting the center position and the intersection; and updating the curvature of the target bend at the target location with the angle, and repeating the calculation of the center position, the tangent direction and the location of the intersection until a preset iteration condition is satisfied.

9. The electronic device according to claim 8, wherein controlling the driving route of the autonomous vehicle on the target bend based on the occupancy width and the location information of the obstacle comprises:

determining an obstacle avoidance distance of the autonomous vehicle driving on the target bend according to the occupancy width; and controlling the driving route of the autonomous vehicle on the target bend based on the location information of the obstacle, so that a lateral distance between the autonomous vehicle and the obstacle exceeds the obstacle avoidance distance.

10. The electronic device according to claim 8, wherein determining the occupancy width based on the size of the autonomous vehicle and the curvature of the target bend comprises:

determining an occupancy width of the autonomous vehicle at a target point when the autonomous vehicle travels to a target location based on a curvature of the target bend at the target location and the size of the autonomous vehicle, wherein, the target point is a projection point of a corner point of the autonomous vehicle on the target bend when the autonomous vehicle travels to the target location of the target bend.

11. The electronic device according to claim 10, wherein the corner point comprises a front corner point and a rear corner point; and determining the occupancy width of the autonomous vehicle at the target point when the autonomous vehicle travels to the target location based on the curvature of the target bend at the target location and the size of the autonomous vehicle, comprises:

in response to determining that the target point is a projection point of the front corner point on the target bend, determining a first width of occupancy of the autonomous vehicle at the target point when the autonomous vehicle travels to the target location based on the curvature of the target bend at the target location and the size of the autonomous vehicle;

in response to determining that the target point is a projection point of the rear corner point on the target bend, determining a second width of occupancy of the autonomous vehicle at the target point when the autonomous vehicle travels to the target location based on the curvature of the target bend at the target location and the size of the autonomous vehicle; and determining the occupancy width of the autonomous vehicle at the target point when the autonomous vehicle travels to the target location based on a larger one of the first width and the second width.

12. The electronic device according to claim 10, wherein determining the occupancy width of the autonomous vehicle at the target point when the autonomous vehicle travels to the target location based on the curvature of the target bend at the target location and the size of the autonomous vehicle, comprises:

obtaining a curve direction of the target bend in a driving direction at the target location;

in response to determine that the curve direction is to the left, determining a right-side occupancy width of the autonomous vehicle at the target point when the autonomous vehicle travels to the target location based on the curvature of the target bend at the target location and the size of the autonomous vehicle, and determining a left-side occupancy width of the autonomous vehicle at the target point when the autonomous vehicle travels to the target location based on a half of a width of the autonomous vehicle; and in response to determine that the curve direction is to the right, determining a left-side occupancy width of the autonomous vehicle at the target point when the autonomous vehicle travels to the target location based on the curvature of the target bend at the target location and the size of the autonomous vehicle, and determining a right-side occupancy width of the autonomous vehicle at the target point when the autonomous vehicle travels to the target location based on a half of the width of the autonomous vehicle.

13. The electronic device according to claim 12, wherein obtaining the curve direction of the target bend in the driving direction at the target location comprises:
    obtaining a first tangent direction at the target location and a second tangent direction at the target point; and
    determining the curve direction according to an angle relation between the first tangent direction and the second tangent direction.

14. The electronic device according to claim 8, wherein obtaining the size of the autonomous vehicle comprises:
    obtaining a maximum vehicle width and a maximum vehicle length of the autonomous vehicle; and
    determining a size of a circumscribed rectangle of the autonomous vehicle as the size of the autonomous vehicle according to the maximum vehicle width and the maximum vehicle length.

15. A non-transitory computer-readable storage medium having computer instructions stored thereon, wherein the computer instructions are configured to make a computer execute a bend driving control method for an autonomous vehicle, the method comprising:
    obtaining a size of the autonomous vehicle and a curvature of a target bend; and
    determining, based on the size of the autonomous vehicle and the curvature of the target bend, an occupancy width of the autonomous vehicle on the target bend when the autonomous vehicle drives on the target bend;
    detecting location information of an obstacle on the target bend; and
    controlling a driving route of the autonomous vehicle on the target bend based on the occupancy width and the location information of the obstacle;
    wherein obtaining the curvature of the target bend comprises:
    selecting any point on the target bend as a projection point of a corner point of the autonomous vehicle on the target bend;
    initializing the curvature of the target bend;
    determining a center position of the autonomous vehicle, a tangent direction corresponding to a driving direction of the autonomous vehicle at the target location, and location of an intersection of an edge at a corner side of the autonomous vehicle and the target bend based on a position of the target point, the curvature of the target bend at the target location and the size of the autonomous vehicle;
    determining an angle between the tangent direction and a line connecting the center position and the intersection; and
    updating the curvature of the target bend at the target location with the angle, and repeating the calculation of the center position, the tangent direction and the location of the intersection until a preset iteration condition is satisfied.

16. The storage medium according to claim 15, wherein controlling the driving route of the autonomous vehicle on the target bend based on the occupancy width and the location information of the obstacle comprises:
    determining an obstacle avoidance distance of the autonomous vehicle driving on the target bend according to the occupancy width; and
    controlling the driving route of the autonomous vehicle on the target bend based on the location information of the obstacle, so that a lateral distance between the autonomous vehicle and the obstacle exceeds the obstacle avoidance distance.

* * * * *